United States Patent [19]
Adams

[11] Patent Number: 6,113,339
[45] Date of Patent: Sep. 5, 2000

[54] AUGER SYSTEM FOR TENDER TRAILER

[75] Inventor: William Wesley Adams, Dewitt, Ark.

[73] Assignee: Industrial Iron Works, DeWitt, Ark.

[21] Appl. No.: 09/001,378

[22] Filed: Dec. 31, 1997

[51] Int. Cl.[7] ........................................................ B60P 1/40
[52] U.S. Cl. ........................ 414/505; 414/523; 414/526; 198/314; 198/538; 198/587
[58] Field of Search .................... 414/503, 504, 414/505, 523, 526; 198/314, 536, 538, 587, 861.4

[56] References Cited

U.S. PATENT DOCUMENTS

| | | |
|---|---|---|
| 3,322,257 | 5/1967 | Phillips . |
| 3,391,778 | 7/1968 | Lasiter . |
| 3,638,816 | 2/1972 | Mann . |
| 3,642,155 | 2/1972 | Carlson . |
| 3,770,101 | 11/1973 | Carlson . |
| 4,119,223 | 10/1978 | Fiechter ................................ 414/526 X |
| 4,218,169 | 8/1980 | Arends ..................................... 414/523 |
| 4,419,037 | 12/1983 | Niewold .................................. 414/489 |
| 4,427,105 | 1/1984 | Hawley et al. ......................... 198/632 |
| 4,459,079 | 7/1984 | Brelsford et al. ...................... 414/505 |
| 4,613,275 | 9/1986 | Karlowsky ............................. 414/489 |
| 5,108,249 | 4/1992 | Kinzenbaw et al. ................... 414/523 |
| 5,409,344 | 4/1995 | Tharaldson ........................ 414/526 X |
| 5,468,113 | 11/1995 | Davis ...................................... 414/523 |
| 5,516,253 | 5/1996 | Linsheid et al. ................... 414/526 X |
| 5,520,495 | 5/1996 | Sukup ..................................... 414/523 |
| 5,529,455 | 6/1996 | Kaster et al. ...................... 414/526 X |
| 5,538,388 | 7/1996 | Bergkamp et al. .................... 414/523 |
| 5,615,990 | 4/1997 | Grieshop ................................ 414/526 |
| 5,655,872 | 8/1997 | Plotkin .................................... 414/526 |
| 5,785,481 | 7/1998 | Ockels ................................ 414/503 X |
| 5,788,055 | 8/1998 | Stewart et al. ..................... 414/523 X |

FOREIGN PATENT DOCUMENTS 2216094  10/1989  United Kingdom ................... 414/505

*Primary Examiner*—James W. Keenan
*Attorney, Agent, or Firm*—Head, Johnson & Kachigian

[57] ABSTRACT

An auger system for a gravitationally dispensing storage receptacle associated with a trailer. The system comprises two discrete sections selectively coupled by a pivot assembly. During coupling, the second section arcuately moves from a stowed position into a discharge position wherein receptive contact is established with the first section. The first section comprises an elongated conveyor disposed beneath the bin to receive dispensed materials for subsequent output adjacent the trailer periphery. The conveyor comprises a cylindrical housing supporting a terminal hydraulic motor that rotates an internal screw auger to propel dispensed particulate material inside the transporter to an output orifice for transfer into the second section for external delivery. The second section comprises a auger transporter that comprises a cylindrical housing supporting a terminal motor rotating an internal screw auger that propels materials therethrough to an external discharge spout. The pivot assembly comprises a reinforcing sleeve that circumscribes an intermediate portion of the auger transporter to secure a hydraulic cylinder and a hinge thereto. The cylinder and hinge are oppositely anchored to the frame in proximity. The sleeve comprises a rigid cylinder that concentrically extends along a portion of the auger transporter and is secured thereto. The hinge comprises a sleeve circumscribing collar defining an integral base that is journalled between an upper trunnion and a lower trunnion by a roll pin. Preferably, the upper trunnion is elevated above the lower trunnion so that the pivot axis established by the roll pin is offset above the horizontal plane of the trailer frame by an offset angle.

15 Claims, 5 Drawing Sheets

AUGER SYSTEM FOR TENDER TRAILER

BACKGROUND OF THE INVENTION

1. Field of the Invention

The present invention relates generally to a discharge auger system for a bulk material storage receptical for fertilizers and the like. More particularly, the present invention relates to an auger system for a trailer wherein the auger folds between a stowed position and a discharge position for dispensing of stored material. Known related prior art may be found in U.S. Class 414, subclass 523, among others.

2. Description of Prior Art

It is known to provide bulk material tenders with pivoting unloading tubes or auger delivery sections that move between a transport or stowed position and a delivery or discharge position. During transport, a portion of the auger is generally positioned alongside the tender while that portion pivots to a position generally traverse to the tender for unloading the tender toward a side during material discharge. As will be appreciated by those skilled in the art, it is critical to efficiently and effectively position the discharge auger tubes for unloading, while providing suitable communication for the material between the tender and the discharge auger.

While the present invention may be utilized with fixed or permanent storage receptacles, it is particularly well suited for use with mobile bulk material tenders. Bulk material tenders of the type contemplated for use with the invention generally deliver large amounts of particulate material, usually in the range of 10 to 40 tons in a single load. This material is typically discharged by the auger system at rates approaching 4,000 lbs/min. Even though large loads are the norm, the auger system usually unloads the tender in a matter of minutes. As may be easily imagined, the time required for the operator to properly position the auger system generally equals or exceeds the time required for discharging the tender load.

The known prior art have utilized articulated auger tubes and discharge auger tubes having multiple sections which are disassembled for stowing and must be reassembled for discharge. These dissassembling augers are time consuming and labor intensive, especially given the time requirements for unloading the tender by the auger system. Other types of prior art devices provide auger systems that are otherwise unduly complex, many having multiple sections that pivot or otherwise move in multiple axes. These complicated auger systems do not normally improve the overall quality of the material delivery but rather add to the costs for such delivery.

Several examples of overly complex devices are shown in the prior art, including U.S. Pat. Nos. 2,877,914, 3,326,397, 4,613,275, all of which are of general relevance. Another complex, though intersting, device is shown in U.S. Pat. Nos. 3,642,155 and 3,770,101, both to Carlson. The Carlson device appears to comprise an articulated unloading boom hinged to one end of a transport body for movement between a travel position and an unloading position. In the travel position, the boom is unfolded against one side of the body while the hinged boom sections are aligned in the unloading position. The boom comprises an upper section and a lower section pivotally joined by a hinge. A hydraulic actuator rotates the upper section between its travel position and its aligned unloading position relative to the lower section.

Another interesting device is shown in U.S. Pat. No. 4,093,087 to DeCoene shows a system for moving an unloading auger tube having a main segment and an end segment between the transport position and a selected unloading position. The end segment is angled with respect to the main segement and it is pivotally mounted on a lower inclined portion of a side wall so as to extend away from the central, vertical fore aft plane of the vehicle. The auger segments are disposed predetermined angles to facilitate auger pivoting about a single axis located perpendicular to the inclined mounting surface of the side wall for movement between the stowed position and a discharge position.

Another overly complex device is shown U.S. Pat. No. 4,613,275 to Karlowski. The Karlowski patent shows an articulated support arrangement for attaching an auger system to a side wall of a truck. This arrangement permits the auger to move between a storage position against the side wall to an operating position parallel to the truck rear. The auger conveyor is supported by a swingable material conveyor support. The support includes a pivot arm moving arcuately about a hinge with a terminal clamp intermediately securing the arm to the auger conveyor. The clamp pivots about a second hinge and third hinge to enable the auger conveyor to pivot about multiple axes when moving between its storage and operating positions. Other patents showing complex devices of generally lesser relevance include U.S. Pat. Nos. 3,322,257 3,391,778, 3,638,816, 4,218,169, 4,419,037, 5,520,495 and 5,615,990.

While the above mentioned prior art devices are generally too complicated for efficient practical use, several simplistic devices are also known in the art. These devices typically require little time for conversion between the transport position and the delivery position.

For example, U.S. Pat. No. 4,742,938 to Niewold shows a positioned mechanism for an auger in which the auger is hydraulically swung between its transport and working positions. The auger tube is mounted at its lower end by a swivel to a wall of a hopper, permitting the auger tube to swing into place via a hydraulic cylinder.

Similarly, U.S. Pat. Nos. 4,427,105,5,108,249,5,538,388 and 5,655,872 all show devices that pivot between a transport and working position via a hydraulic cylinder and a terminally hinged auger tube. However, all of these devices pivot about a terminal hinge. In other words, the hinge is located at the end of the tube.

A very interesting device is shown in U.S. Pat. No. 5,468,113 to Davis. Davis shows an auger that pivots in multiple axes about an intermediary point proximate one end. Apparently, the auger moves between the transport and delivery positions by pivoting about a first pivotal mount that cooperates with a second pivotal mount. When in the delivery position, the auger maintains dust-free communication with the storage receptacle.

The known prior art fails to provide an efficient auger system for unloading bulk material tenders that overcome problems associated with efficient and practical conversion between the stowed and discharge positions while avoiding unnecessarily structurally instable pivotal couplings. Known multiple segmented or articulated pivoting auger systems are usually difficult and time consuming to convert between stowed and discharge positions. Further, known prior art devices with auger systems that pivot in multiple axes during conversion between stowed and discharge positions often require experienced operators to properly position the auger system. Prior art devices using couplings having terminal hinges or cylinders are inherently instable because the entire wieght of the auger is pivoted about a terminus. In particular, no known prior art device distributes the stresses generated during the conversion of the auger system between its stowed and discharge positions adequately.

Thus, a desirable improvement to the art would be an auger system for a tender that enabled an unskilled operator to quickly and efficiently convert the system between a stowed and a discharge position. A particularly desirable improvement would be an auger system that adequately distributed stresses generated during auger conversion.

SUMMARY OF THE INVENTION

My improved auger system overcomes the above referenced problems associated with the known prior art. The auger system is particularly well adapted for use with a conventional fertilizer tender trailer with multiple storage bins wherein each bin dispenses stored particulate materials through an orifice on the lowermost section or bottom of the bin. The auger system comprises two discrete sections that may be selectively coupled by selectively pivoting the second section into receptive contact with the first section.

The first section comprises an elongated conveyor with spaced apart ends proximate the trailer front and rear respectively. Preferably, the conveyor is disposed beneath the bin bottom to receive the stored particulate materials as they are dispensed from the bin. The conveyor then moves the dispensed particulate materials, preferably to the receptacle periphery, for subsequent discharge therefrom. The conveyor comprises a cylindrical housing supporting a terminal hydraulic motor that rotates an internal screw auger that propels the dispensed particulate material along conveyor interior toward and through an output orifice.

The orifice outputs the dispensed material from the housing either upon the ground or, preferably, into the second section for subsequent discharge. The second section comprises a pivotable, elongated auger conveyor that arcuately moves between a stowed position and a discharge position. When in the stowed position, the auger transporter is substantially parallel to the trailer longitudinal axis. When in the discharge position, the auger transporter is substantially perpendicular to the trailer longitudinal axis with an end disposed beneath the transporter orifice to receive materials output therefrom. The auger transporter comprises a cylindrical housing supporting a terminal motor rotating an internal screw auger that propels materials therethrough to a discharge spout.

The first and second auger sections couple as a result of the selective actuation of an intermediate pivot assembly. The pivot assembly comprises a concentric sleeve that circumscribes an intermediate portion of the auger transporter to secure a conventional hydraulic cylinder and a hinge thereto. The reinforcing sleeve comprises a rigid cylinder that concentrically extends along an intermediate portion of the auger transporter and is secured thereto. The cylinder defines a flange at one end that facilitates the connection of the conventional hydraulic cylinder thereto. The hydraulic cylinder is anchored to the trailer frame at its other end. The hydraulic cylinder moves the auger transporter through an arc defined by the hinge assembly between the stowed and discharge positions. The hinge comprises a sleeve circumscribing collar that is secured to the auger transporter opposite the hydraulic cylinder. The collar defines an integral base that is journalled between an upper trunnion and a lower trunnion by a roll pin for rotational movement. Preferably, the upper trunnion is elevated above the lower trunnion so that the pivot axis established by the roll pin is offset above the horizontal plane established by the trailer frame by an offset angle. The offset angle may be between 30 and 60° but is preferably 45°.

Preferably, the hydraulic cylinder and collar are anchored to the frame proximate one another so that only a small section of frame need be strategically reinforced to accommodate the additional stresses exerted by the auger transporter during pivotal movement. The coextensive rigid cylinder serves to dissipate stresses experienced by the auger transporter during pivoting along a significant portion of the auger transporter.

During transportation, the auger system is uncoupled and the second section is stowed adjacent the bin and parallel to the longitudinal axis of the trailer. During discharge operation, the tender trailer delivers its stored particulate material to a selected location. The operator couples the discrete auger sections by pivoting the second section into receptive contact with the first section by manipulating a remote engine and control system. As the hydraulic cylinder secured to the sleeve extends, it pushes against the frame to raise the auger transporter from its horizontal stowed position arcuately 90° into a vertically elevated and laterally displaced discharge position that lies in a plane perpendicular to the horizontal plane defined by the trailer frame.

Thus, a primary object of the present invention is to provide an improved auger system that may be converted between its stowed and discharge positions by relatively unskilled operators.

A basic object of the invention is to increase delivery efficiency in bulk material tenders to reduce costs.

Another basic object of the present invention is to provide an auger system that distributes stresses generated during the conversion between a stowed and a discharge position.

A related object of the invention is to provide an improved auger system that promotes efficient operation in conjunction with increased longevity by distributing rotational stresses over a substantial portion of the system.

Another object of the invention is to restrict auger system rotation to a single axis while distributing stress generated during rotation through a significant portion of the system.

DETAILED DESCRIPTION OF THE INVENTION

Figure 1:
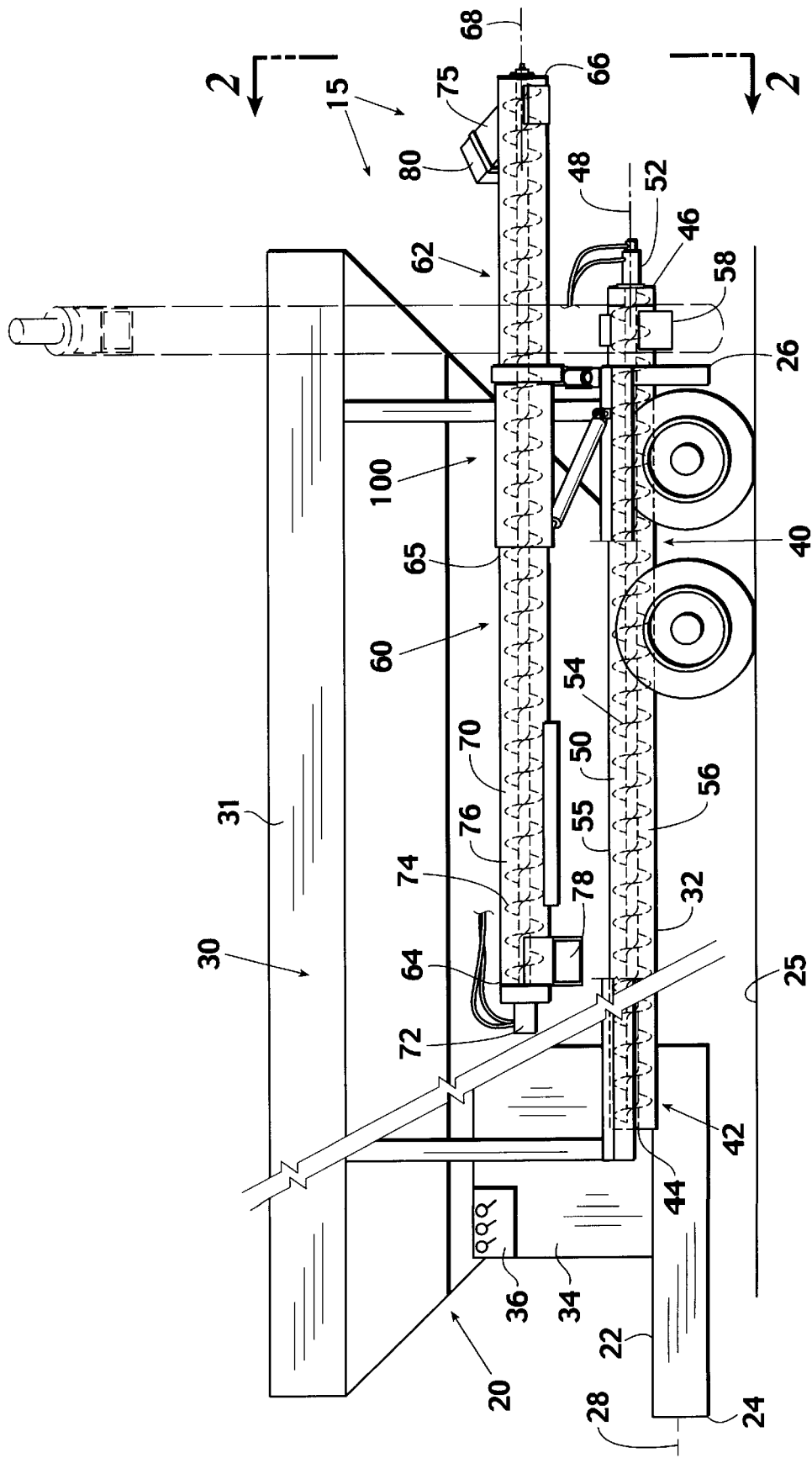
FIG. 1 is a partially fragmented environmental view with pieces omitted or fragmented for clarity, showing a preferred embodiment of my improved auger system installed on a conventional tender trailer and with the auger transporter in the stowed position.

My improved auger system is generally designated by reference numeral 15 in FIGS. 1–5. The improved system 15 may be used with any type of storage receptacle although it is particularly well adapted for use with conventional temporary storage bins mounted on a mobile platform. Contemplated mobile platforms the system may be mounted upon include barges and other maritime vessels, railcars, conventional motorized vehicles, especially fertilizer trucks, and trailers drawn by draft vehicles, especially fertilizer tender trailers.

A preferred embodiment of the invention is shown in FIG. 1 wherein the auger system 15 is associated with a mobile trailer 20 that has at least one storage receptacle 30 adapted to dispense particulate material gravitationally therefrom. In another preferred embodiment, trailer 20 comprises a conventional fertilizer tender trailer supporting a receptacle that comprises multiple storage bins wherein each bin dispenses stored particulate materials through an orifice on the lowermost section or bottom of the bin. Of course, the particulate materials may be fertilizer or any other type of particulate material, including sand, gravel and the like, so long as the material is dispensable from the receptacle.

A conventional tender trailer generally comprises a wheeled frame 22 that is between 28 and 56 feet in length and approximately 8 feet in width. The frame 22 is adapted to be coupled to and drawn by a conventional draft vehicle (not shown). The frame supports at least one bin 30 that is adapted to temporarily receive and store particulate material. Ideally, the preferred tender trailer 20 is approximately 48 feet in length with three abutting bins supported thereon.

Normally, the receptacle 30 comprises at least one bin 31. Bin 31 generally comprises a hollow shell measuring 14 feet in length by 8 feet in width by 8 feet in depth. Of course, if practical dimensional requirements demand, bin 31 can be larger or several bins may be installed in an abutting manner as desired to fit a particular trailer configuration. A conventional bin design acceptable for use with the invention has an inverted pentagonal cross-section so that materials can be deposited into the bin through its top for temporary storage and then they can be dispensed from the bin bottom via gravitational flow.

Figure 2:
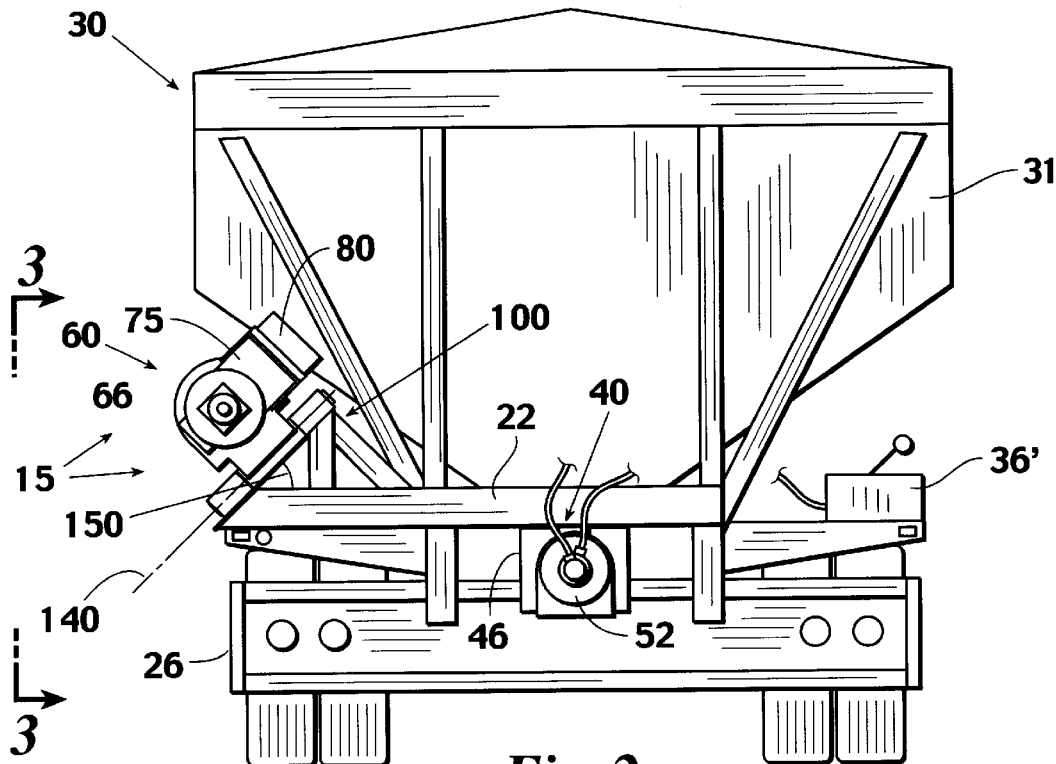
FIG. 2 is a rear elevational view showing an alternative location for the control valve bank of the invention.

In use, the auger system 15 unloads the trailer 20 by discharging the stored particulate material in bin 31 to a selected discharge location (discharge position shown in dashed lines in FIG. 1). System 15 is remotely powered by an internal gasoline engine 34 or other acceptable power source that provides motive power. A preferred power unit comprises a 72 hp internal combustion engine. The motive power is transferred via conventional hydraulic tubing and controlled via valve bank 36. An alternative bank location is shown in FIG. 2 and identified by reference numeral 36'. Preferably, the auger system 15 comprises discrete sections 40 and 60 that may be selectively coupled by operation of a hinge element 100.

The first section 40 comprises an elongated conveyor 42 with spaced apart ends 44 and 46. Preferably, end 44 is proximate the trailer front 24 while end 46 is proximate the trailer rear 26. Thus, conveyor 42 traverses the longitudinal axis 28 of the trailer. Ideally, conveyor 42 is disposed beneath the lowermost bin portion or bottom 32 and it is appropriately orificed to permit the stored particulate materials to be dispensed therein. The conveyor 42 then moves the dispensed particulate materials for subsequent discharge from trailer 20.

The conveyor 42 preferably comprises a cylindrical housing 50 extending between ends 44 and 46. A hydraulic motor 52, driven by engine 34 and bank 36, adjacent end 46 rotates an internal screw auger 54 extending between ends 44 and 46 via an integral shaft and conventional coupling (not shown). Motor 52 and screw auger 54 are journalled to and inside housing 50 by pillow bearings or the like (not shown) for rotation in the conventional manner. The housing top 55 preferably abuts bottom 32 and it is appropriately orificed as necessary to facilitate gravitational dispensing of the particulate material stored in bin 31. The dispensed material enters the housing interior 56 where it contacts the screw auger 54. During dispensing, motor 52 rotates screw auger 54, which subsequently propels the dispensed particulate material along interior 56 toward and through an output orifice 58.

Orifice 58 outputs the dispensed material from the housing 50 at the periphery of trailer 20. Preferably, orifice 58 is adjacent end 46 although it should be appreciated that it could be located elsewhere along housing 50. Regardless of the positioning of orifice 58, the output material is either deposited directly upon the ground 25 or, more preferably, it is deposited into the second section 60 for subsequent discharge.

Figure 2A:
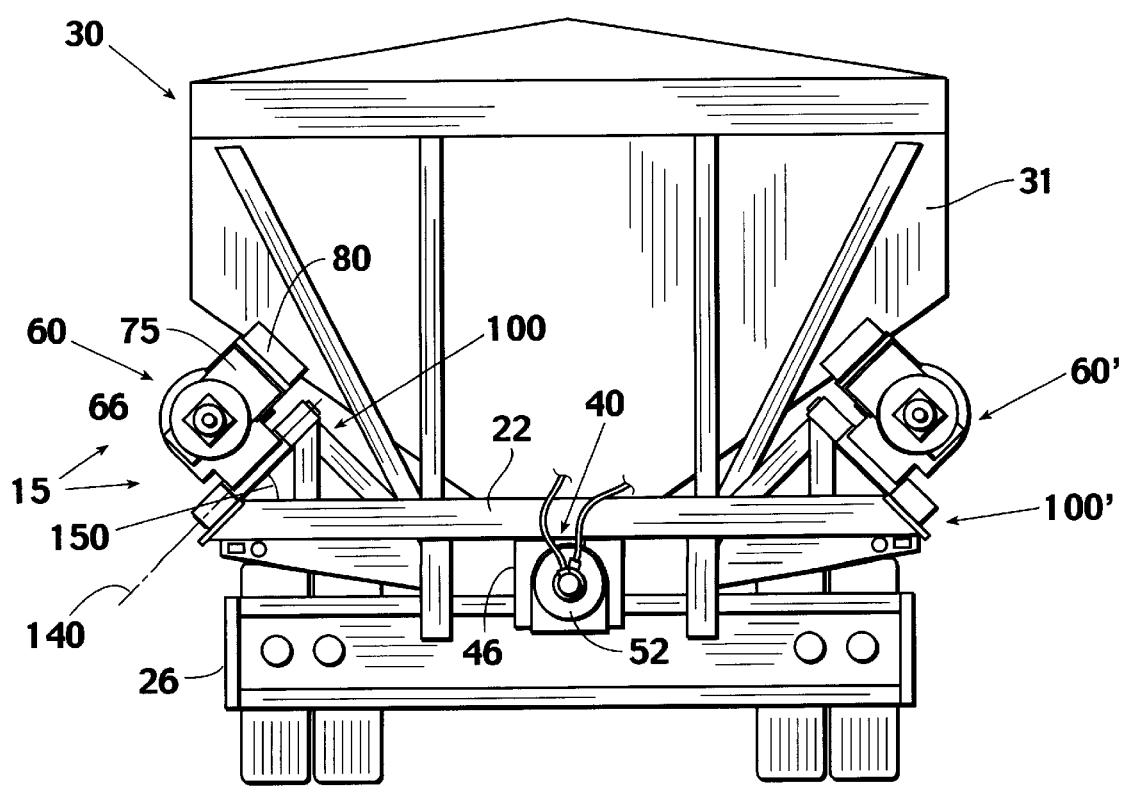
FIG. 2A is a rear elevational view similar to FIG. 2 but showing an alternative embodiment with auger transporters on the right and left sides of the trailer.

The second section 60 comprises a pivotable elongated auger transporter 62 with spaced apart ends 64 and 66. Preferably and as shown in FIG. 2, section 60 is located on the left side of trailer 20 but section 60 could be secured on either or both sides of bin 31 as is shown in FIG. 2A. The second auger transporter is indicated by reference numeral 60' and the additional hinge element is indicated by reference numeral 100'. In all other respects excluding direction of pivot, the section 60' and hinge element 100' are identical to their counterparts (i.e., section 60 and element 100). The auger transporter 62 pivots between a stowed position and a discharge position. When in the stowed position, end 64 is proximate the trailer front 24 and conveyor end 44 while end 66 is proximate the trailer rear 26 and conveyor end 46. When in the discharge position, end 64 is vertically above the discharge location while end 66 couples to end 46 so that auger transporter 62 receives output materials from conveyor 42 for subsequent discharge from trailer 20. In other words, the auger transporter longitudinal axis 68 is substantially parallel with the longitudinal trailer axis 28 and longitudinal conveyor axis 48 (shown best in FIG. 1) when stowed and the auger transporter longitudinal axis 68 lies in a plane perpendicular to trailer axis 28 and conveyor axis 48 when ready to discharge.

The auger transporter 62 preferably comprises a cylindrical housing 70 extending between ends 64 and 66. A hydraulic motor 72, driven by engine 34 and bank 36, adjacent end 64 rotates an internal screw auger 74 extending between ends 64 and 66 via an integral shaft and conventional coupling (not shown). Motor 72 and screw auger 74 are journalled to and inside housing 70 by pillow bearings or the like (not shown) for rotation in the conventional manner.

Figure 4:
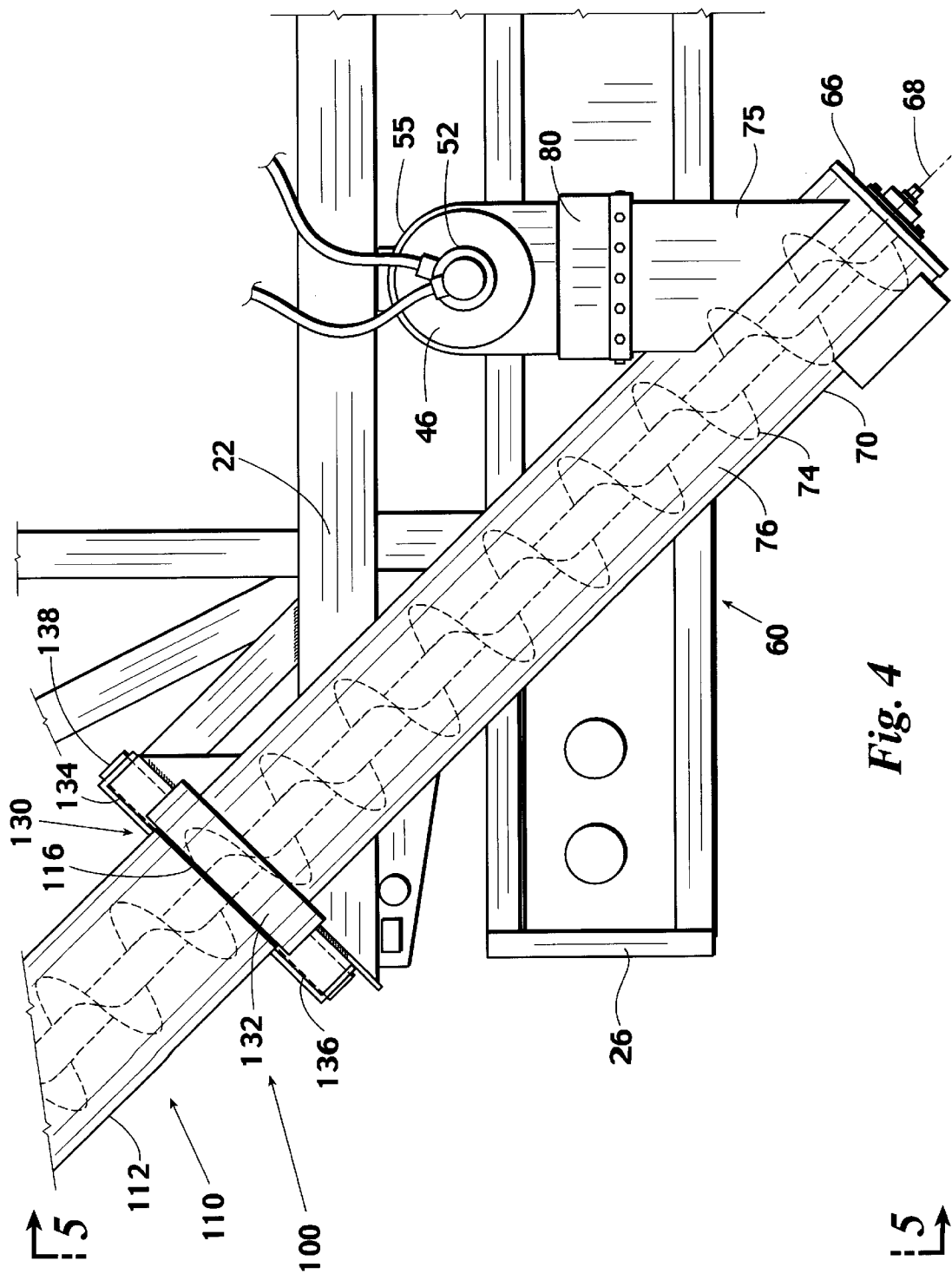
FIG. 4 is an enlarged, partially fragmented side elevational taken from the encircled area of FIG. 2, with portions omitted or fragmented for clarity and showing the auger system in the discharge position; and, FIG. 5 is an enlarged, partially fragmented side elevational view similar to FIG. 3 but showing the auger system in the discharge position.
Figure 5:
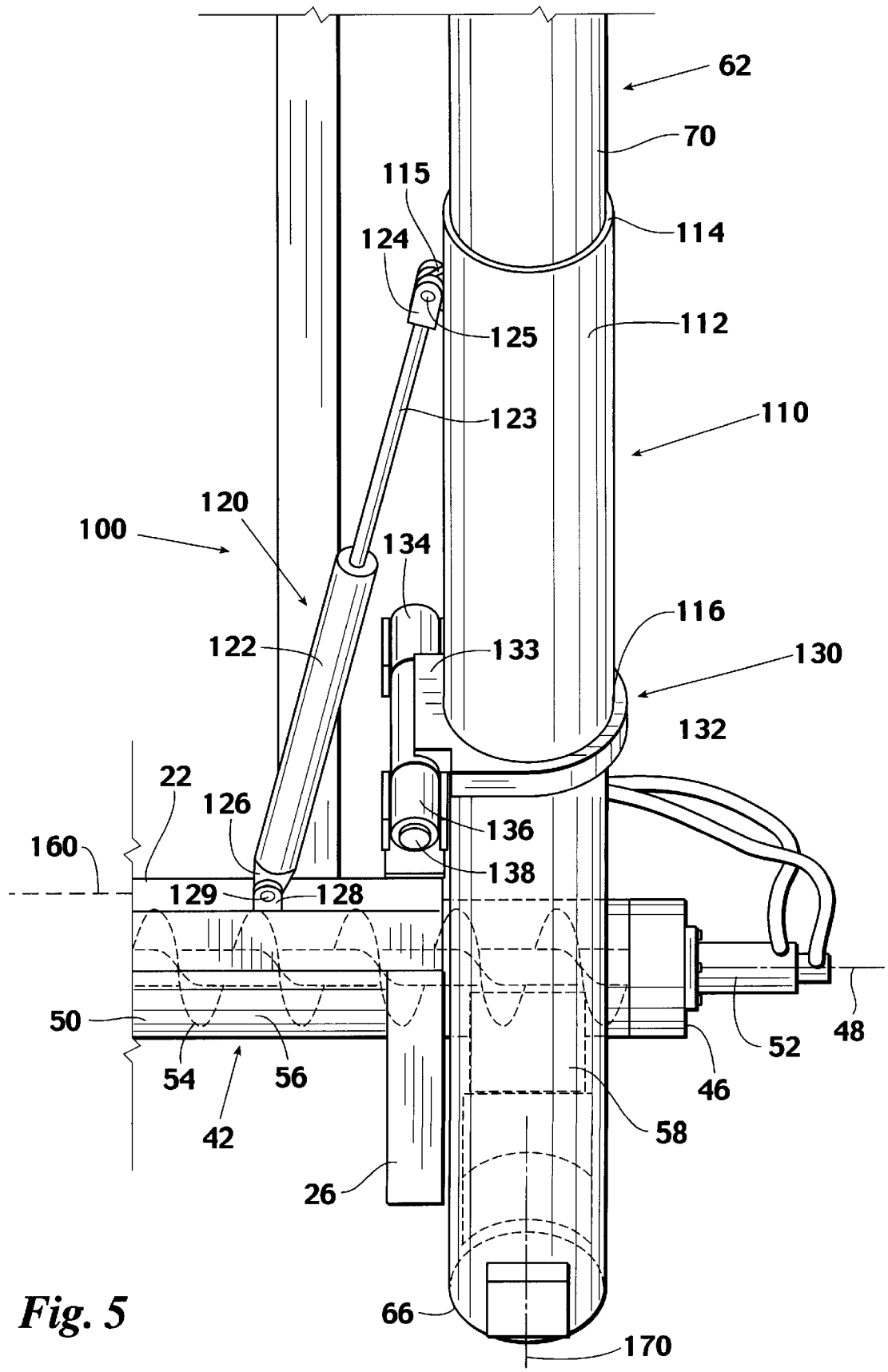

When discharging materials in the preferred manner (as indicated by dashed lines in FIG. 1 and as shown in FIGS. 4–5), the first and second sections 40, 60 are coupled so that an input hopper 75 receives the output material from orifice 58. Flexible flaps 80 upwardly extend from the hopper 75 to ensure that materials output from orifice 58 are directed into hopper 75. The output material then enters the housing interior 76 where it contacts the screw auger 74. During dispensing, motor 72 rotates screw auger 74, which subsequently propels the dispensed particulate material along interior 76 toward and through the discharge spout 78.

The first and second auger sections 40, 60 couple as a result of the selective actuation of the hinge element 100. The element 100 comprises a concentric sleeve 110 that circumscribes a portion of section 60 to secure a conventional hydraulic cylinder 120 and a hinge assembly 130 thereto.

The reinforcing sleeve 110 comprises a rigid cylinder 112 that concentrically extends along a portion of the auger transporter 62 and is secured thereto. Ideally, the rigid cylinder 112 integrally extends for approximately 4 feet along auger transporter 62. The ratio of sleeve length to transporter length should be between 1:4 and 1:5 to adequately distribute rotational stress. The rigid cylinder 112 has spaced apart ends 114 and 116 that are intermediately located between auger transporter ends 64 and 66. Ideally, sleeve end 116 is located at least 4 feet from auger transporter end 66 while end 114 is proximate the second section midpoint 65.

The end 114 defines a flange 115 that facilitates the connection of the conventional hydraulic cylinder 120 thereto. The hydraulic cylinder 120 comprises a bore 122 with an elongated, telescoping shaft 123. Shaft 123 comprises a terminal yoke 124 that couples to flange 115 via pin 125. The bore 122 defines a terminal flange 126 protruding oppositely from shaft 123. Flange 126 inserts between tabs 127, 128 that are anchored to frame 22. Flange 126 is coupled to tabs 127, 128 via pin 129. Thus, the hydraulic cylinder 120 may pivots at either yoke 124 or flange 126 as the shaft 123 telescopically emerges from bore 122 during auger transporter pivoting.

The hinge assembly 130 comprises a collar 132 that is secured to auger transporter 62 adjacent end 116. Collar 132 defines an integral base 133 that is journalled between an upper trunnion 134 and a lower trunnion 136 for rotational movement relative thereto by a pivot element, preferably roll pin 138. The upper and lower trunnions 134, 136 are anchored to frame 22 proximate tabs 126, 127. Preferably, the upper trunnion 134 is elevated above the plane of the lower trunnion 136 so that the pivot axis 140 established by roll pin 138 is above the horizontal plane established by frame 22 by an offset angle 150. Offset angle 150 may be between 30 and 60° but is preferably 45° for most configurations. Thus, the upper trunnion 134 is elevated between 0.5 and 1.5 feet above the lower trunnion 136.

Since tabs 126, 127 and trunnions 134, 136 are proximate one another, only a small section of frame 22 need be strategically reinforced to accommodate the additional stresses exerted by the second section 60 during pivotal movement. On the other hand, the coextensive rigid cylinder 112 serves to dissipate stresses experienced by the second section 60 during pivoting along a significant portion of the auger transporter 62. The rigid cylinder 112 further decreases the rotational stresses experienced by the second section 60 during pivoting as a result of the placement of end 114 proximate the second section midpoint 65 and the placement of end 116 distally from auger transporter end 66.

As a further result of the placement of tabs 126, 127, trunnions 134, 136 and sleeve 110, the shortest possible cylinder stroke is achieved (approximately 2 feet). In other words, the length of the telescoping shaft 123 is believed to be as short as possible while also minimizing stresses on the second section 60 as a result of the configuration described herein.

Since the preferred tender trailer is approximately 48 feet in length, conveyor 42 should be approximately 30 feet in length while the auger transporter 62 would be approximately 18 feet in length. Of course, as the trailer length increases or decreases, the conveyor length would correspondingly increase or decrease. However, the auger transporter length should remain constant so that the discharge location remains constant. Regardless of the auger transporter length, the ratio of sleeve to transporter length should remain constant. In other words, the length of sleeve 112 should extend for between a quarter and a fifth of the auger transporter length to adequately distribute rotational stresses. Moreover, the offset angle should remain between 30 and 60° to permit the coupling movement of section 60 when pivoting between the stowed and discharge positions.

Figure 3:
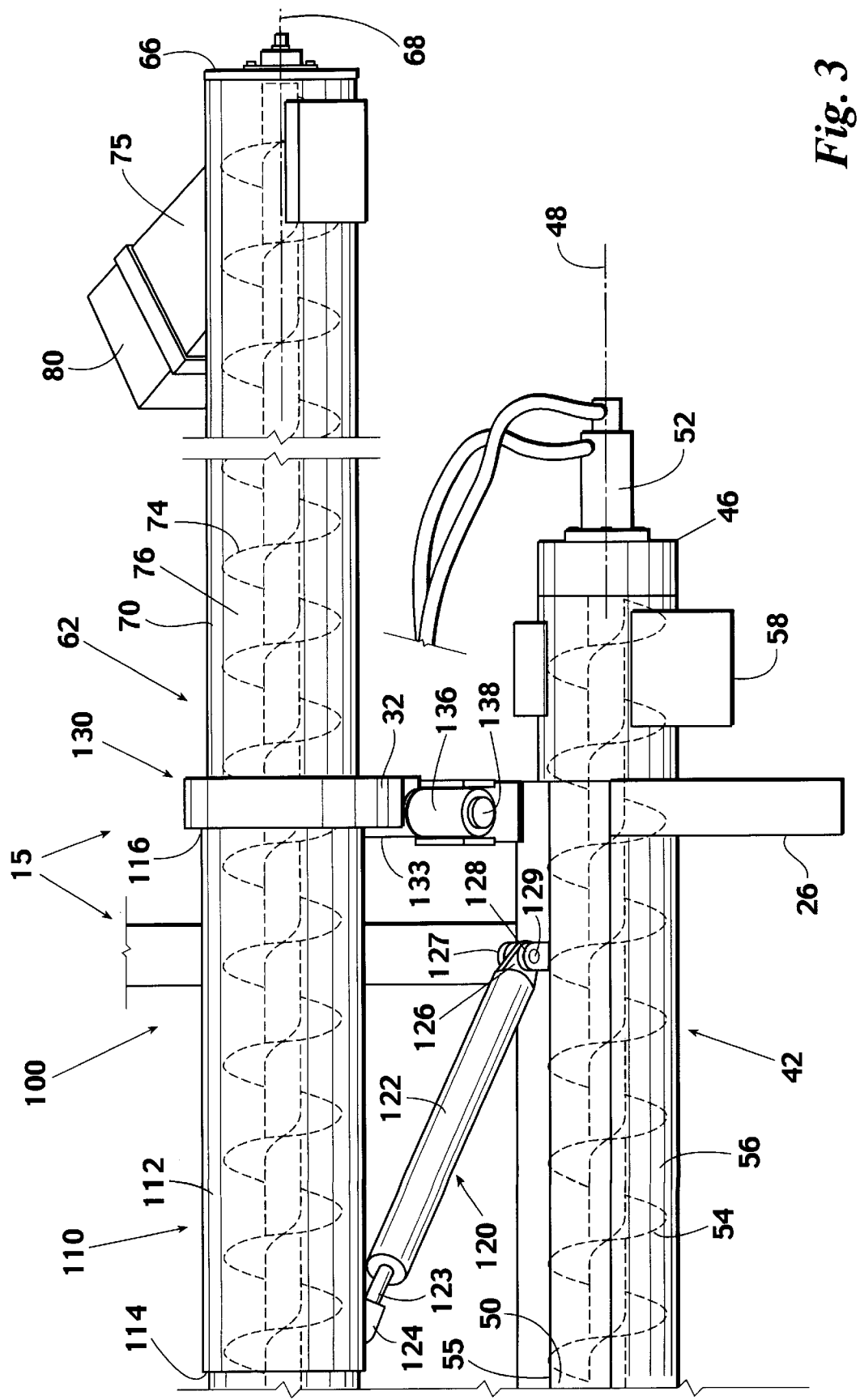
FIG. 3 is an enlarged, partially fragmented side elevational view taken from the encircled area of FIG. 1, with portions omitted or fragmented for clarity.

During transportation, the auger system 15 is uncoupled and the second section 60 is stowed adjacent bin 31 as shown in FIGS. 1–3. During discharge operation, the tender trailer delivers its stored particulate material to a selected location. The operator may selectively discharge material through either orifice 58 or spout 78. However, the commonly preferred manner of discharging material is through spout 78. In this manner, the discharged material can be deposited at an elevated height and at a distance from the tender trailer for deposit into bins or other receptacles.

The operator pivots section 60 into the appropriate coupling arrangement via bank 36. As the hydraulic cylinder 120 extends, it pushes against tabs 127, 128, which raises auger transporter end 64 from its horizontal position arcuately. As auger transporter end 64 raises, the opposite auger transporter end 66 is simultaneously lowered toward orifice 58 arcuately. At the zenith of hydraulic cylinder 120 with shaft 123 fully extended, the auger transporter 72 has moved from a stowed position defining a substantially horizontal plane coplanar to the horizontal plane 160 defined by frame 22 to a discharge position defining a substantially vertical plane 170 that is perpendicular to the horizontal plane 160.

Whereas, the present invention has been described in relation to the drawings attached hereto, it should be understood that other and further modifications, apart from those shown or suggested herein, may be made within the spirit and scope of this invention.

What is claimed is:

1. A trailer for delivering particulate material, said trailer comprising:

a wheeled frame with spaced apart ends;

a storage receptacle supported by said frame, said receptacle adapted to temporarily receive and store said particulate material until selectively dispensed therefrom;

an output conveyor beneath said receptacle, said output conveyor adapted to receive material dispensed from said receptacle and move said dispensed material to the trailer periphery for subsequent output therefrom;

an elongated auger transporter with spaced apart ends, said transporter adapted to be stowed adjacent said receptacle in a transport position and to selectively pivot from said transport position into a discharge position wherein said auger transporter couples to said output conveyor to receive said dispensed material, said auger transporter adapted to deliver said dispensed material to the exterior of said trailer;

a hinge element comprising an elongated sleeve with spaced apart ends intermediate said transporter ends, said sleeve circumscribing a portion of said auger transporter, a collar pivotally secured to said sleeve proximate one of said sleeve ends and a telescoping cylinder pivotally secured to said sleeve proximate the other of said sleeve ends, said collar and said cylinder pivotally securing said auger transporter to said frame while permitting said auger transporter to selectively move between said transport and said discharge positions; and, wherein said cylinder may be selectively extended or retracted to move said auger transporter between said transport and said discharge positions.

2. The trailer as defined in claim 1 wherein said transporter has a midpoint proximate one of said sleeve ends.

3. The trailer as defined in claim 2 wherein said cylinder couples to said sleeve end proximate said transporter midpoint.

4. The trailer as defined in claim 1 wherein said sleeve circumscribes at least 20% of the total length of said auger transporter.

5. The trailer as defined in claim 1 wherein said collar further comprises an upper trunnion mount, a lower trunnion mount and a pivot element extending therebetween.

6. The trailer as defined in claim 5 wherein said upper and lower trunnions form an offset angle with respect to said frame, said offset angle being between 35° to 55° from the vertical.

7. The trailer as defined in claim 1 wherein said trailer further comprises:
   a second auger transporter with spaced apart ends, said transporter adapted to be stowed adjacent said receptacle in a transport position and to selectively pivot from said transport position into a discharge position wherein said second auger transporter couples to said output conveyor to receive said dispensed material, said second auger transporter adapted to selectively deliver said dispensed material to the exterior of said trailer by selectively replacing said elongated auger transporter;
   a second hinge element comprising an elongated sleeve with spaced apart ends intermediate said second auger transporter ends, said sleeve circumscribing a portion of said second auger transporter, a collar pivotally secured to said sleeve proximate one of said sleeve ends and a telescoping cylinder pivotally secured to said sleeve proximate the other of said sleeve ends, said collar and said cylinder pivotally securing said second auger transporter to said frame while permitting said second auger transporter to selectively move between said transport and said discharge positions.

8. An auger system for discharging materials from a wheeled vehicle having a frame with a longitudinal axis and a receptacle with at least one gravity dispensing storage bin, said auger system comprising:
   a first section substantially parallel to said longitudinal axis of the vehicle beneath said at least one bin, said section adapted to receive materials dispensed from said at least one bin for subsequent output through an integral terminus;
   a pivoting second section adapted to couple to said first section to receive said output material to subsequently discharge said material away from said vehicle said second section comprising:
      an elongated tubular housing with spaced apart ends;
      a hopper formed at one of said housing ends, said hopper abutting said terminus when said pivoting section is coupled to said first section, said hopper adapted to directly receive said output materials, said hopper comprising at least two flexible flaps to prevent loss of said output material;
      a reinforcing sleeve circumscribing a portion of said housing intermediate said ends, and forming an integral hinge for securing said second section to said frame while permitting movement of said second section, said sleeve having spaced apart ends intermediate said housing ends and said hinge further comprising a collar pivotally secured to said sleeve proximate one of said sleeve ends;
      a discharge spout formed at the other of said housing ends to discharge said output material exteriorly from said vehicle; and,
   means for pivoting said second section from a stowed position to receptively couple said second section to said first section, said means for pivoting comprising a telescoping cylinder pivotally secured to said sleeve proximate the other of said sleeve ends, said cylinder adapted to be selectively extended or retracted to rotate said second section relative to said frame.

9. The system as defined in claim 8 wherein said sleeve circumscribes at least 20% of the total length of said housing.

10. The system as defined in claim 8 wherein said collar further comprises an upper trunnion mount, a lower trunnion mount and a pivot element extending therebetween and said upper and lower trunions form a vertical offset angle between 35° to 55° from the vertical.

11. The system as defined in claim 8 wherein said wheeled vehicle comprises a trailer for delivering particulate material and wherein said frame comprises a wheeled frame with spaced apart ends and wherein said receptacle comprises a storage receptacle supported by said frame, said receptacle adapted to temporarily receive and store said particulate material until selectively dispensed therefrom.

12. A trailer for delivering particulate material, said trailer comprising:
   a wheeled frame with iced apart ends;
   a storage receptacle supported by said frame, said receptacle adapted to temporarily receive and store said particulate material until selectively dispensed therefrom;
   an output conveyor beneath said receptacle, said output conveyor adapted to receive material dispensed from said receptacle and move said dispensed material to the trailer periphery for subsequent output therefrom;
   an elongated auger transporter with spaced apart ends, said transporter adapted to be stowed adjacent said receptacle in a transport position and to selectively pivot from said transport position into a discharge position wherein said auger transporter couples to said output conveyor to receive said dispensed material, said auger transporter adapted to deliver said dispensed material to the exterior of said trailer;
   a hinge element comprising an elongated sleeve with spaced apart ends intermediate said transporter ends, said sleeve circumscribing a portion of said auger transporter, a collar pivotally secured to said sleeve proximate one of said sleeve ends and a telescoping cylinder pivotally secured to said sleeve proximate the other of said sleeve ends, said collar and said cylinder pivotally securing said auger transporter to said frame while permitting said auger transporter to selectively move between said transport and said discharge positions, said collar further comprising an upper trunion mount, a lower trunion mount and a pivot element extending therebetween and said upper and lower trunions forming a vertical offset angle between 35 degrees to 55 degrees from the vertical; and,
   wherein said cylinder may be selectively extended or retracted to move said auger transporter between said transport and said discharge positions.

13. The trailer as defined in claim 12 wherein said transporter has a midpoint proximate one of said sleeve ends and wherein said cylinder couples to said sleeve end proximate said transporter midpoint.

14. The trailer as defined in claim 12 wherein said sleeve circumscribes at least 20% of the total length of said auger transporter.

15. The trailer as defined in claim 12 wherein said trailer further comprises:

a second auger transporter with spaced apart ends, said transporter adapted to be stowed adjacent said receptacle in a transport position and to selectively pivot from said transport position into a discharge position wherein said second auger transporter couples to said output conveyor to receive said dispensed material, said second auger transporter adapted to selectively deliver said dispensed material to the exterior of said trailer by selectively replacing said elongated auger transporter;

a second hinge element comprising an elongated sleeve with spaced apart ends intermediate said second transporter ends, said sleeve circumscribing a portion of said second auger transporter, a collar pivotally secured to said sleeve proximate one of said sleeve ends and a telescoping cylinder pivotally secured to said sleeve proximate the other of said sleeve ends, said collar and said cylinder pivotally securing said second auger transporter to said frame while permitting said second auger transporter to selectively move between said transport and said discharge positions.

* * * * *